United States Patent [19]

Kodama et al.

[11] Patent Number: 4,911,680
[45] Date of Patent: Mar. 27, 1990

[54] HERMETICALLY SEALED AUTOTENSIONER

[75] Inventors: Hisashi Kodama, Nagoya; Yoshio Okabe, Chiryu; Yukimori Kobayashi, Gamagori, all of Japan

[73] Assignee: Aisin Seiki Kabushiki Kaisha, Kariya, Japan

[21] Appl. No.: 328,498

[22] Filed: Mar. 24, 1989

[30] Foreign Application Priority Data

Mar. 24, 1988 [JP] Japan .................................. 63-38972

[51] Int. Cl.$^4$ .............................................. F16H 7/12
[52] U.S. Cl. ..................................... 474/136; 474/110
[58] Field of Search ........................ 474/101, 109–111, 474/113, 133, 135, 136, 138

[56] References Cited

U.S. PATENT DOCUMENTS 4,790,796 12/1988 Okabe et al. ..................... 474/138 X Primary Examiner—Thuy M. Bui
Attorney, Agent, or Firm—Oblon, Spivak, McClelland, Maier & Neustadt

[57] ABSTRACT

A hermetically sealed autotensioner used for adjusting tension of engine belts comprises a cylinder, a plunger slidably fitted in the cylinder and having a rod projeced from the cylinder, a free piston slidably fitted in the cylinder, and a rod guide fitted in the tip portion of the cylinder so as to slidably support the rod. When a large thrust force acts on the rod, the rod guide serves as a bearing for the rod so that no scuffing or rocking motion occurs between the cylinder and the plunger.

1 Claim, 2 Drawing Sheets

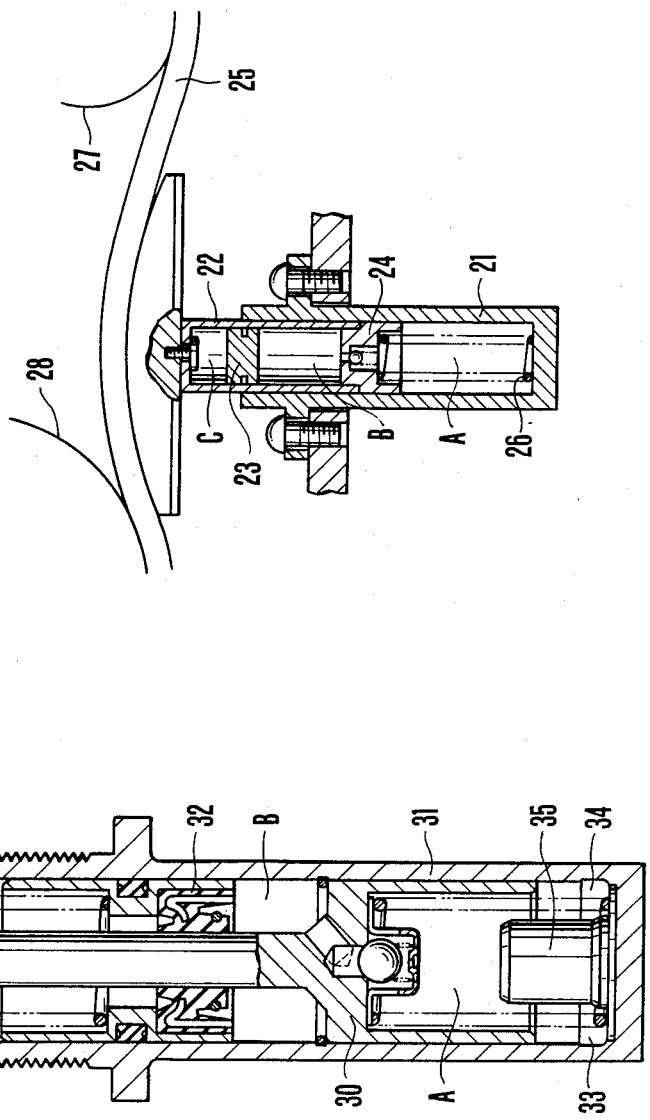

HERMETICALLY SEALED AUTOTENSIONER

BACKGROUND OF THE INVENTION

1. Field of the Invention

This invention relates to a hermetically sealed autotensioner for adjusting tension of engine belts.

2. Description of Prior Arts

A conventional device related to this invention is, for example, disclosed in Japanese Utility Model Laid-open Publication No. 87652 of 1981 (Jitsu-kai-sho 56-87652).

This prior art shows a belt tensioner as mentioned in FIG. 5. A stationary cylinder 21 ha a movable cylinder 22, a movable piston 23 and a plunger 24 fitted therein, which divide the space therein into a first oil chamber A, a second oil chamber B and an air chamber C. When the temperature of the engine changes from ordinary to high or vice versa, the tension on a timing belt 25 increases or decreases, thereby correspondingly increasing or decreasing the load on the movable cylinder 22. The resulting outflow or inflow of oil from the first oil chamber A and second oil chamber B permits keeping the tension of the timing belt at a proper level.

The numeral 26 designates a return spring, while 27 and 28 denote pulleys attached to the engine. However, by lacking such means as to exactly guide the compression of the return spring 26 in the first oil chamber A, the plunger 24 in the above mechanism tends not to operate precisely.

FIG. 4 shows another autotensioner according to Japanese Utility Model Application No. 149824 of 1987 which is an improvement over the device described above. The hermetically sealed autotensioner of FIG. 4 comprises a cylinder 31, with a plunger 30 with a monobloc rod 30a and a free piston 32, which divide the space therein into a first oil chamber A, a second oil chamber B and an air chamber C, fitted therein. A cylinder guide 35 at the bottom of the cylinder 31 urges and fastens a return spring 34 compressed in the first oil chamber A.

In the above autotensioner, the tension of the belt puts a load on the tip of the rod 30a, while the up-down motion of the free piston 32 absorbs the tension. When a large thrust acts on the tip of the rod 30a, however, the rod 30a is apt to tilt because no bearing is provided at the top thereof. The slightest tilt of the rod can produce an abrasive wear on the sliding surfaces of the plunger 30 and cylinder 31 that determine the performance characteristic of the autotensioner. The wear is likely to bring about a change in the performance characteristic of the autotensioner or a rocking phenomenon.

SUMMARY OF THE INVENTION

The object of this invention is to provide an autotensioner of such construction as will develop no scuffing or rocking between the plunger and cylinder.

The autotensioner of this invention comprises a plunger slidably fitted in a cylinder, one end thereof facing a first oil chamber at the bottom of the cylinder, with the other end facing a second oil chamber. The plunger ha a monobloc rod projecting from the cylinder. A free piston sealed away from the rod is also slidably fitted in the cylinder. A cylinder guide and a return spring are disposed at the bottom of the cylinder. A rod guide slidably supporting the tip portion of the rod is provided at the tip portion of the cylinder.

The rod moves up and down in the cylinder as the temperature of an engine changes from ordinary to high or vice versa. But even if a large thrust acts on the rod, no scuffing or rocking motion occurs between the lower portion of the cylinder and the plunger because the inner surface of the rod guide press-fitted in the upper portion of the cylinder and held in contact with the sliding rod serves as a bearing.

By the aforementioned structure and operation, the autotensioner of this invention can bring about the following effects:

(1) To enhance the reliability of an autotensioner (through the prevention of changes in performance characteristic and rocking);

(2) To remove the thrusting force, which can cause abrasive wear and rocking, from the leak surface more thoroughly than a surface treatment given to the surface of the plunger and, therefore, offers much greater improvement;

(3) To reduce the play of the rod through the provision vision a guide to support the tip of the rod, permitting the stabilization of the leak-down characteristic and enhancement of the reliability of the sealing function of the hermetically sealed autotensioner; and (4) To eliminate the intricate control and significant cost increase that are required when a surface treatment is given to the leak surface that is finished with as fine a smoothness as of the order of microns in order to achieve the desired leak-down characteristic.

The foregoing and other objects, features and advantages of the present invention will be understood more clearly and fully from the following detailed description of preferred embodiments with reference to the attached drawings.

BRIEF DESCRIPTION OF THE DRAWINGS

FIG. 4 is a cross-sectional view of a conventional autotensioner.

FIG. 5 is a cross-sectional view of another conventional autotensioner.

DESCRIPTION OF THE PREFERRED EMBODIMENT

Now a preferred embodiment of this invention will be described below.

Figure 1:
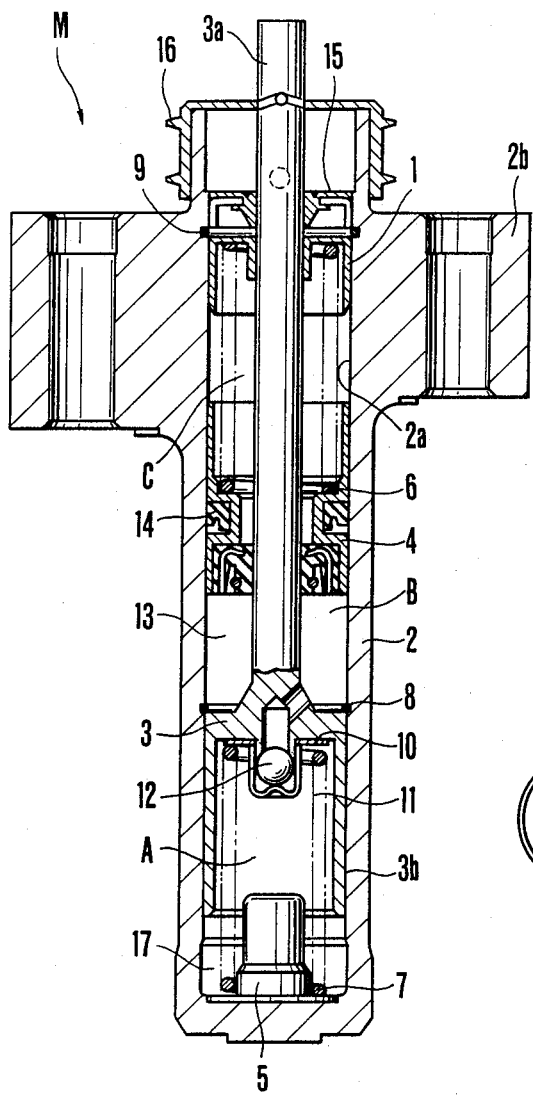
FIG. 1 is a vertical cross-sectional view of an autotensioner embodying this invention.
Figure 2:
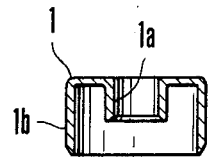
FIG. 2 is a cross-sectional view showing principal parts of the autotensioner mentioned in FIG. 1.

In FIG. 1, numeral 1 designates a rod guide, 2 a cylinder, 2a an inner cavity in the upper portion of the cylinder and 2b a body integral with the cylinder.

Numeral 3 denotes a plunger integral with a rod 3a that projects from the cylinder 2 and moves toward and away from a timing belt.

Numeral 4 denotes a free piston, 5 a spacer disposed at the bottom of the cylinder and 6 a free-piston return spring.

Another return spring 7 is disposed at the bottom of the cylinder. Numerals 8 and 9 designate snap rings. Numeral 10 denotes a washer, 11 a retainer and 12 a check valve.

Numerals 13 and 14 show seals for the free piston. Numeral 15 designates a seal disposed in the upper portion of the cylinder, 16 a cap and 17 oil.

The rod guide 1 is shaped like an inverted-cup having a through hole la at the center thereof, as shown in FIG.

2. The rod guide 1 is either clearance-fitted or press-fitted in the inner cavity 2a. The rod 3a slides through the through hole 1a in the rod guide 1.

When a timing belt exerts a tension on the tip of the rod 3a (a tensioner is more or less subjected to a thrusting force because of the force of the belt transmitted from an oscillating idler), a thrusting component of the tension applies a load on the plunger surface 3b, which is the larger-diameter portion of the rod that forms a leak surface on which the leak-down function of the tensioner depends. The rod guide 1 absorbs the thrusting load.

The rod guide adapted to receiving the thrusting force disposed midway between the larger-diameter portion and the tip of the rod separates the thrust receiving portion away from the leak surface, thereby eliminating the probability of causing abrasive wear and scuffing between the cylinder and plunger.

Figure 3:
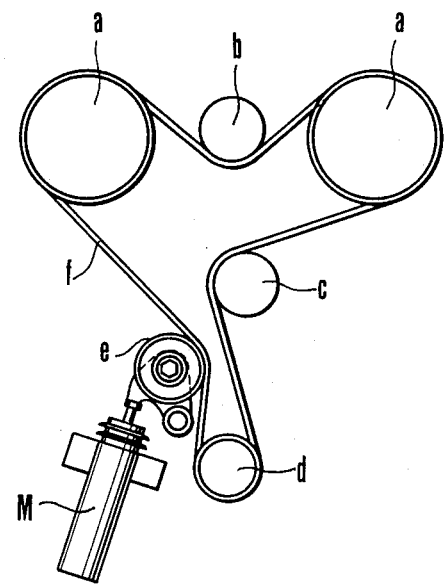
FIG. 3 shows the autotensioner fitted in an engine.

FIG. 3 illustrates an autotensioner M of this invention in position. Reference character a designates a cam shaft of an engine, b and c denote idler pulleys, d designates a crank pulley, e an oscillating idler and f a timing belt.

It should be understood that, although the preferred embodiment of the present invention has been described herein in considerable detail, certain modifications, changes, and adaptations may be made by those skilled in the art and that it is hereby intended to cover all modifications, changes and adaptations thereof falling within the scope of the appended claims.

What is claimed is:

1. A hermetically sealed autotensioner comprising:
   a plunger slidably fitted in a cylinder and having a rod projecting from the cylinder, one end of said plunger facing a first oil chamber at the bottom of the cylinder and the other end thereof facing a second oil chamber,
   a free piston slidably fitted in the cylinder and sealed away from said rod,
   a cylinder guide and a return spring disposed at the bottom of the cylinder, and
   a rod guide fitted in the upper portion of the cylinder so as to slidably support the tip portion of said rod, said rod guide being shaped like an inverted-cup and having at the center thereof a through hole with a cylindrical guide section for slidably receiving said rod.

* * * * *